Dec. 25, 1934.                    J. D. HOUCK                    1,985,411
                                 FAUCET FILTER
                              Filed June 13, 1932
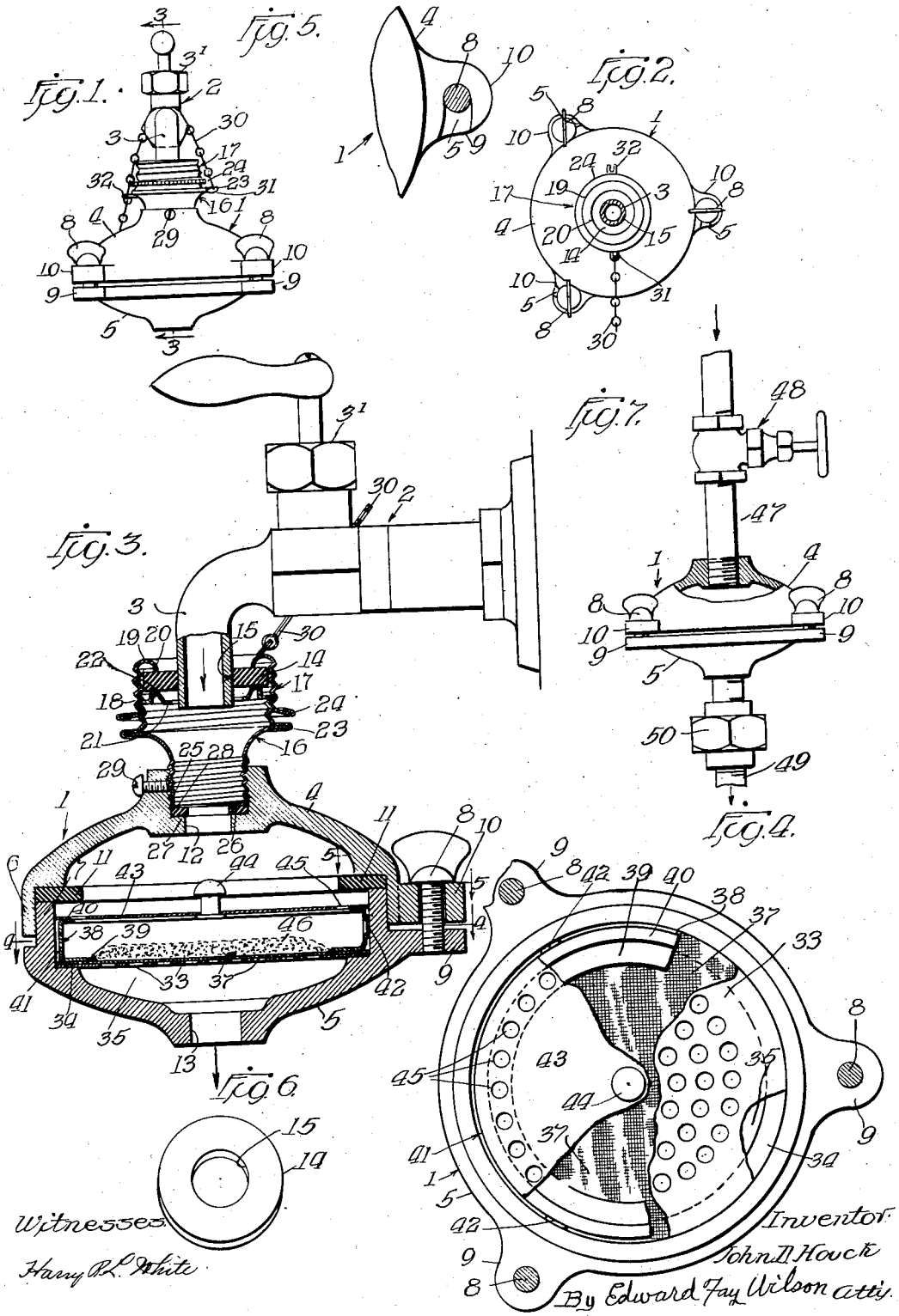

Patented Dec. 25, 1934

1,985,411

UNITED STATES PATENT OFFICE 1,985,411

FAUCET FILTER

John D. Houck, Chicago, Ill.

Application June 13, 1932, Serial No. 616,965

6 Claims. (Cl. 210—87)

This invention relates to improvements in filters and has special reference to filters particularly adapted and arranged for use on a faucet.

The object of the invention is to provide a simple, durable filter which shall be readily opened for cleaning and renewing the filtering material; which shall be readily attachable to an ordinary faucet having a smooth discharge end; which shall be adapted for using a pulverulent filtering material; and which shall be arranged and adapted to prevent any disturbance or perforation of the filtering material once it has been set.

To the accomplishment of the above and associated ends, the invention consists in the arrangement of parts and devices hereinafter fully described and particularly pointed out in the appended claims, the accompanying drawing forming part of this specification and the following description setting forth in detail one embodiment exemplifying the invention, such disclosed arrangement of parts and devices and combinations thereof constituting, however, but one of the various applications of the principle of the invention.

Referring to the drawing:—

Figure 1 is a front elevation of the filter shown installed on a faucet;

Fig. 2 is a top plan view of the filter;

Fig. 3 is a vertical central section of the filter and a fragmentary section of the faucet on the line 3—3 of Fig. 1;

Fig. 4 is a horizontal section substantially on the line 4—4 of Fig. 3, various parts being broken away to best disclose the structure;

Fig. 5 is a fragmentary horizontal section on the line 5—5 of Fig. 3;

Fig. 6 is a perspective view of one of the packing washers by which a tight connection is made between the filter casing and the faucet; and Fig. 7 is a view similar to Fig. 1, but showing the filter connected in a water-supply pipe.

In said drawing 1 represents the filter and 2 a faucet upon which the filter is adapted to be secured in pressure tight relation.

The faucet has a smooth discharge nozzle 3 upon which the filter is adapted to be mounted to receive water through the faucet, and the faucet has a valve 31 indicated by its handle for controlling the flow of water through the faucet.

The filter consists of a spheroidal shell or casing made of an upper part 4 and a lower part 5. These two parts are formed with telescoping circumferential walls 6 and 7 respectively at their meeting edges and they are adapted to be tightly clamped together by clamping bolts 8. Preferably three of the clamping bolts are provided which are threaded into ears 9 projecting from the outer edge of the lower part 5 and arranged to engage hooked projections 10 on the outer edge of the upper part 4.

For packing the joint between the two parts a ring gasket 11 of yielding material such as rubber is provided. The projecting wall 6 of the upper part is outside of the projecting wall 7 of the lower part and the gasket 11 is arranged to fit tightly in its periphery within the wall 6 so that when the lower part is removed the gasket 11 will remain in place in the upper part 4.

These two parts 4 and 5 are hollow and open toward each other. The part 4 is provided with a central inlet opening 12 at its top and the lower part 5 is provided with a central outlet opening 13 at its bottom.

For securing the filter upon the faucet, the upper part is provided with a packing 14 of yielding material such as rubber. This member 14 is in the form of a flat washer and has a central opening 15 of a size which fits tightly upon the outer surface of the faucet nozzle 3. As the nozzles of faucets vary in size, the packing washer 14 is made readily removable and washers with central holes of various sizes are provided so that a suitable washer can be selected and used. For removably securing the packing washer 14 to the filter in pressure tight relation there is provided a pair of sheet metal connecting members 16 and 17. These are formed, as shown at 18, for screwing together to clamp the ring 14 between them. The member 17 has an in-turned rim 19 having a down-turned edge 20 adapted to engage the upper surface of the packing washer 14 and the member 16 has a top flange 21 formed with an upwardly-projecting circumferential rib 22 opposed to the down-turned edge 21 adapted to engage the lower surface of the packing washer 14. When the two members 16 and 17 are screwed tightly together the washer 18 is tightly clamped in position and can be forced upon the nozzle 3.

The parts 16 and 17 are provided with outwardly projecting edge portions 23 and 24 respectively which are preferably roughened for convenience in grasping them to screw them together or separate them.

The lower member 16 is provided with a screw-threaded nozzle 25 at its bottom and the top member 4 of the filter is provided with a similarly screw-threaded opening for receiving. A yielding packing washer 26 is adapted to be clamped between a shoulder 27 on the member 4 and an in-turned flange 28 at the lower end of the nozzle 25 to provide a pressure tight connection between these two members. To prevent the inadvertent loosening of the member 16 from the upper filter member 4 a set screw 29 may be provided.

To prevent the pressure of the water forcing the filter off of the nozzle, once it has been installed, a tie member such as a chain 30 is provided. One end of the chain is secured permanently to the upper member 4 at one point 31, and the free end of the chain is adapted to be secured to the opposite side of the member 4 by means of a securing member 32 fastened to the member 4 and forked to receive one of the links of the chain. The chain 30 is of a suitable length to permit it to be drawn up over the faucet 2 behind the valve 4 and down on the other side of the faucet and engage in the forked securing member 32.

The filtering means comprises a foraminous plate 33 arranged and adapted to rest at its outer edge on a circumferential shoulder 34 formed in the lower part 5 and above a collecting chamber 35 with which the outlet 13 communicates.

A filter sheet 37 of suitable filtering material such as paper or cloth of substantially the area of the foraminous or perforate plate 33 is laid on top of the plate.

A holding or clamping ring 38 is arranged and adapted to fit tightly in the upper part of the lower member 5 and is adapted to be forced down into clamping contact with the filter sheet 37 and bind the same at its outer edge upon the perforate plate 33 and the two upon the shoulder 34.

The binding ring 38 is U-shaped in cross-section having a lower inwardly-projecting flange 39 and an upper inwardly projecting flange 40. These flanges are connected by the web 41 of the ring 38 and which is slightly smaller in diameter than the inner diameter of the wall 7 of the member 5. For producing friction to hold the binding ring clamped tightly upon the filter sheet, the ring which is slightly yielding is provided with rounded outer projections 42, preferably three of them equally spaced around the surface of the ring and projecting to such an extent that when the ring is forced down to place it is slightly distorted.

The top flange 40 serves as a finger hold for pushing the ring down to place or pulling it out. The top flange 40 is considerably narrower than the bottom flange 39.

Above the ring 38 there is a distributing or directing plate 43 which rests at its outer edge upon the top flange 40. This plate 43 has a knob 44 at its center by which it can be readily lifted.

To complete the filter proper, besides the filter sheet 37 there is provided a quantity of filtering material which is placed upon the filter sheet in powdered form. This material is pulverulent and spreads out over the exposed portion of the filter sheet and over the lower flange 39 of the binding ring 38.

The plate 43 is provided with a ring of perforations 45 near its outer edge and in position so that the water in passing downwardly through said openings will be projected or fall upon the lower flange 39 of the ring 38.

After the filter has been installed with the pulverulent filtering in the filter, the first action of the water as it passes through the filter is to wash the pulverulent filtering material off of the flange 39 and pile it up in a layer 46 on the filter sheet within the inner edge of the flange 39 as best shown in Fig. 3.

The water filtering through the layer or mass 46 and the filter sheet 37 passes through so evenly all over the whole area that it does not disturb the material but tends to retain it evenly distributed.

The location of the distributor holes 45 near the edge of the plate 43 and over the flange 38 prevents the water which passes the plate 43 from disturbing the filtering material.

When it is desired to clean the filter or renew the filtering material the bolts 8 are loosened and then the lower part 5 is rotated slightly to free the bolts from the hooks 10. The inner part can then be readily removed from the part 10, and the filter renewed.

Besides the installation of the filter illustrated in Figs. 1 to 6 inclusive, the filter may be installed in a water supply pipe, as illustrated in Fig. 7, for supplying filtered water to water-using devices such as coffee urns, drinking water tanks, etc.

In this form of installation the upper part 4 of the filter is screwed directly upon a water supply pipe 47 which is usually provided with a control valve 48. The lower part 5 of the filter is connected to a delivery pipe 49 by a union 50.

When it is desired to open the filter for cleaning it and renewing the filtering material, the union 50 is separated and the clamping screws are loosened and then the lower part 5 can be readily removed.

The filter is exceedingly simple, durable, easily installed for use, and is very effective in filtering out all foreign substances from the water.

As many modifications of the invention will readily suggest themselves to one skilled in the art I do not limit or confine the invention to the specific details of construction herein shown and described.

I claim:

1. In a filter of the kind described, a foraminous support for a filter sheet, a filter sheet thereon, means covering and protecting a part only of the filter sheet, pulverulent filtering material on the uncovered part of the filter sheet, and means spaced above the filter sheet arranged and adapted to direct the passing liquid first upon the means protecting a part of the filter sheet.

2. In a filter of the kind described, a casing having an inlet at the top and an outlet at the bottom, filtering means dividing the upper part of the casing from the lower part thereof, said filtering means including a foraminous filter sheet support, a filter sheet thereon, a filter sheet binder member provided with a flange arranged and adapted to cover the outer edge portion of the filter sheet, pulverulent filtering material on the uncovered part of the filter sheet, a water-spreading member spaced above said flange, the spreader provided with water passage openings near its outer edge adapted to direct the passing water upon said flange, as and for the purpose specified.

3. In a filter of the kind described, a casing having an inlet and an outlet, a partition dividing the inlet end of the casing from the outlet end, said partition including a foraminous wall, an imperforate protection covering the outer edge portion of said wall, a filtering medium on the uncovered central portion of the foraminous wall, a second wall spaced above the first wall and provided with fluid passage openings only above said imperforate protector.

4. In a filter of the kind described, a casing having an inlet at the top and an outlet at the bottom, a foraminous filter-sheet-support between the inlet and the outlet, a filter sheet thereon, a filter sheet binder member having a lower flange arranged and adapted to contact with and cover the outer edge portion only of the filter sheet, and means for causing liquid passing through the filter to fall upon said flange and not upon the unprotected central part of a filter sheet.

5. In a filter of the kind described, a casing having an inlet at the top and an outlet at the bottom, a foraminous filter-sheet-support between the inlet and the outlet, a filter sheet thereon, a filter sheet binder member having a lower flange arranged and adapted to contact with and cover the outer edge portion only of the filter sheet, pulverulent filtering material on the uncovered part of the filter sheet, and means for causing liquid passing through the filter to fall upon said flange and not upon the pulverulent filtering material.

6. In a filter of the kind described, a casing having an inlet at the top and an outlet at the bottom, a foraminous partition between the inlet and the outlet arranged and adapted to receive and support a filter sheet, a filter sheet binder member having a lower flange arranged and adapted to contact with and cover the outer edge portion of a filter sheet on said support, and means for causing liquid passing through the filter to fall upon said flange and not upon the unprotected part of the filter sheet.

JOHN D. HOUCK.